United States Patent
Wright et al.

(10) Patent No.: US 11,699,299 B2
(45) Date of Patent: Jul. 11, 2023

(54) BIOACOUSTIC AUTHENTICATION

(71) Applicant: Nokia Technologies Oy, Espoo (FI)

(72) Inventors: Christopher Wright, London (GB); Phil Catton, Cambridge (GB); Wai Lau, London (GB)

(73) Assignee: Nokia Technologies Oy, Espoo (FI)

( * ) Notice: Subject to any disclaimer, the term of this patent is extended or adjusted under 35 U.S.C. 154(b) by 20 days.

(21) Appl. No.: 17/350,302

(22) Filed: Jun. 17, 2021

(65) Prior Publication Data

US 2022/0004730 A1 Jan. 6, 2022

(30) Foreign Application Priority Data

Jul. 2, 2020 (EP) .................................... 20183621

(51) Int. Cl.
*G06V 40/13* (2022.01)
*G06V 40/60* (2022.01)

(52) U.S. Cl.
CPC .......... *G06V 40/1306* (2022.01); *G06V 40/67* (2022.01)

(58) Field of Classification Search
CPC .... G06V 40/1306; G06V 40/67; G06F 21/32; G06F 2203/04104; G06F 2203/04106; G06F 3/0304; G06F 3/03547; G06F 3/043; G06F 3/0488; G06F 2200/1636
See application file for complete search history.

(56) References Cited

U.S. PATENT DOCUMENTS

| 8,542,095 B2 | 9/2013 | Kamei |
| 9,277,334 B1 | 3/2016 | Wong et al. |
| 10,515,282 B1* | 12/2019 | Rowland .............. G06V 40/172 |
| 2014/0310801 A1 | 10/2014 | Juhani et al. |
| 2016/0077615 A1 | 3/2016 | Schwarz et al. |
| 2019/0050618 A1 | 2/2019 | Khuri-yakub et al. |

(Continued)

FOREIGN PATENT DOCUMENTS

| CN | 109672774 A | 4/2019 |
| EP | 3191924 A1 | 7/2017 |
| WO | 2007/109989 A1 | 10/2007 |

(Continued)

OTHER PUBLICATIONS

Sim et al., "Identity Recognition Based on Bioacoustics of Human Body", IEEE Transactions on Cybernetics, vol. 51, No. 5, May 2021, pp. 2761-2772.

(Continued)

*Primary Examiner* — Edward F Urban
*Assistant Examiner* — Wassim Mahrouka
(74) *Attorney, Agent, or Firm* — Harrington & Smith (57) ABSTRACT

According to various, but not necessarily all, embodiments there is provided an apparatus comprising means for: determining at least two locations at which a user touches a device; selecting a first location and a second location from the at least two locations to define a transmission path for an acoustic signal through the user; applying an acoustic signal to the user through the first location; detecting an acoustic signal transmitted through the user at the second location; and analysing the detected acoustic signal to determine if it is indicative of transmission of the applied acoustic signal through an authorised user based on a known bioacoustic signature of the authorised user.

16 Claims, 4 Drawing Sheets

(56) References Cited

U.S. PATENT DOCUMENTS

| | | | |
|---|---|---|---|
| 2019/0191306 A1 | 6/2019 | Mulders | |
| 2020/0184057 A1* | 6/2020 | Mukund | ............... H04W 12/06 |

FOREIGN PATENT DOCUMENTS

| | | | |
|---|---|---|---|
| WO | 2014/169220 A1 | 10/2014 | |
| WO | 2016/040010 A1 | 3/2016 | |
| WO | 2019/125273 A1 | 6/2019 | |
| WO | 2019/235988 A1 | 12/2019 | |

OTHER PUBLICATIONS

Li et al., "Velody: Nonlinear Vibration Challenge-Response for Resilient User Authentication", Proceedings of the 2019 ACM SIGSAC Conference on Computer and Communications Security, Nov. 11-15, 2019, pp. 1201-1213.

"Samsung to Show off Sound-Producing Display Tech at CES 2019?", Android Authority, Retrieved on Jun. 15, 2021,, Webpage available at : https://www.androidauthority.com/samsung-sound-on-display-ces-2019-937774/.

"LG G8 ThinQ to have OLED screen as speaker", ZDNet, Retrieved on Jun. 15, 2021,, Webpage available at : https://www.zdnet.com/article/lg-g8-thinq-to-have-oled-screen-as-speaker/.

"Huawei's Crazy New Phone Ditches the Ear Speaker and Lets you Hear Calls through a Vibrating Screen", Business Insider, Retrieved on Jun. 15, 2021,, Webpage available at : https://www.businessinsider.com/huawei-p30-pro-ditches-ear-speaker-vibrating-screen-2019-3?r=US&IR=T.

Yang et al., "Echolock: Towards Low Effort Mobile User Identification", arXiv, Apr. 9, 2020, pp. 1-15.

Extended European Search Report received for corresponding European Patent Application No. 20183621.0, dated Dec. 14, 2020, 7 pages.

Schneegass et al., "SkullConduct: Biometric User Identification on Eyewear Computers Using Bone Conduction Through the Skull", Proceedings of the 2016 CHI Conference on Human Factors in Computing Systems, May 2016, pp. 1379-1384.

* cited by examiner

BIOACOUSTIC AUTHENTICATION

TECHNOLOGICAL FIELD

Embodiments of the present disclosure relate to bioacoustic authentication. Some relate to bioacoustic authentication by transmitting acoustic signals between a device and user's hand at locations where touch contact is established.

BACKGROUND

Authentication methods require the user to perform an action to supply credentials to verify their identity. Multi-factor authentication methods require the user to perform multiple actions. These actions are frequently not relevant to the task to which the user wishes to attend.

BRIEF SUMMARY

According to various, but not necessarily all, embodiments there is provided an apparatus comprising means for: determining at least two locations at which a user touches a device; selecting a first location and a second location from the at least two locations to define a transmission path for an acoustic signal through the user; applying an acoustic signal to the user through the first location; detecting an acoustic signal transmitted through the user at the second location; and analysing the detected acoustic signal to determine if it is indicative of transmission of the applied acoustic signal through an authorised user based on a known bioacoustic signature of the authorised user.

According to various, but not necessarily all, embodiments there is provided a method comprising: determining at least two locations at which a user touches a device; selecting a first location and a second location from the at least two locations to define a transmission path for an acoustic signal through the user; applying an acoustic signal to the user through the first location; detecting an acoustic signal transmitted through the user at the second location; and analysing the detected acoustic signal to determine if it is indicative of transmission of the applied acoustic signal through an authorised user based on a known bioacoustic signature of the authorised user.

According to various, but not necessarily all, embodiments there is provided a computer program that, when run on a computer, performs: causing determination of at least two locations at which a user touches a device; selecting a first location and a second location from the at least two locations to define a transmission path for an acoustic signal through the user; causing application of an acoustic signal to the user through the first location; causing detection of an acoustic signal transmitted through the user at the second location; and analysing the detected acoustic signal to determine if it is indicative of transmission of the applied acoustic signal through an authorised user based on a known bioacoustic signature of the authorised user.

According to various, but not necessarily all, embodiments there is provided examples as claimed in the appended claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

The following portion of this "Brief Summary" section, describes various features that may be features of any of the embodiments described in the foregoing portion of the "Brief Summary" section. The description of a function should additionally be considered to also disclose any means suitable for performing that function.

For the at least two touch locations, the parts of the user's hand which provide the touch contact may be determined.

Selecting the first location and a second location may comprise: identifying available transmission paths, for an acoustic signal, through the user between the parts of the user's hand which provide the touch contact; and selecting one of the available transmission paths.

Selecting of one of the available transmission paths may be based on authentication confidence scores associated with the available transmission paths.

Selecting the first location may be conditional on the first location being one for which localised vibrations can be controlled to produce a target acoustic signal.

Selection of the second location may be conditional on the second location being one for which localised vibrations can be measured.

The applied acoustic signal may be adapted for the defined transmission path.

The applied acoustic signal may be adapted based on one or more touch properties at the first and/or second locations.

Analysing the detected acoustic signal may comprise: processing the detected acoustic signal to extract the transfer function of the transmission path; and determining whether the extracted transfer function corresponds to the known bioacoustic signature of the authorised user.

Access to at least one application may be controlled in dependence on whether or not the detected acoustic signal is indicative of transmission of the applied acoustic signal through an authorised user.

Guidance may be provided to the user which indicates where the user should touch the device based on which possible transmission paths have the highest associated authentication confidence scores.

A hand posture of the user when touching the device at the at least two locations may be determined. Selection of the first location and the second location may be conditional on the hand posture corresponding to a predefined hand posture for the user.

Applying an acoustic signal to the user through the first location may comprise causing multiple movable elements of an actuator, or a plurality of actuators, to vibrate a panel forming at least part of a display or casing of the device so that a superposition of vibrations at the first location produces the acoustic signal.

BRIEF DESCRIPTION

Some examples will now be described with reference to the accompanying drawings in which.

DETAILED DESCRIPTION

Examples of the disclosure relate to an apparatus 101 that can be configured to authenticate that a user of a device 401 is an authorised user. This is achieved by applying an acoustic signal to the user so that it is transmitted through the user and back to the device 401.

The acoustic signals are transmitted along paths formed by the user's bones. The acoustic transmission properties of these paths are affected by, for example, the structure, size, and weight of the bones. Thus, individuals can be distinguished by bioacoustic signatures reflecting their unique bone structures.

By authenticating the user using acoustic signals transmitted through the user, the user's identity can be verified while they begin to or continue to use the device 401 for the task to which they wish to attend. Separate, task-irrelevant user actions to establish their credentials may not be required.

Figure 1:
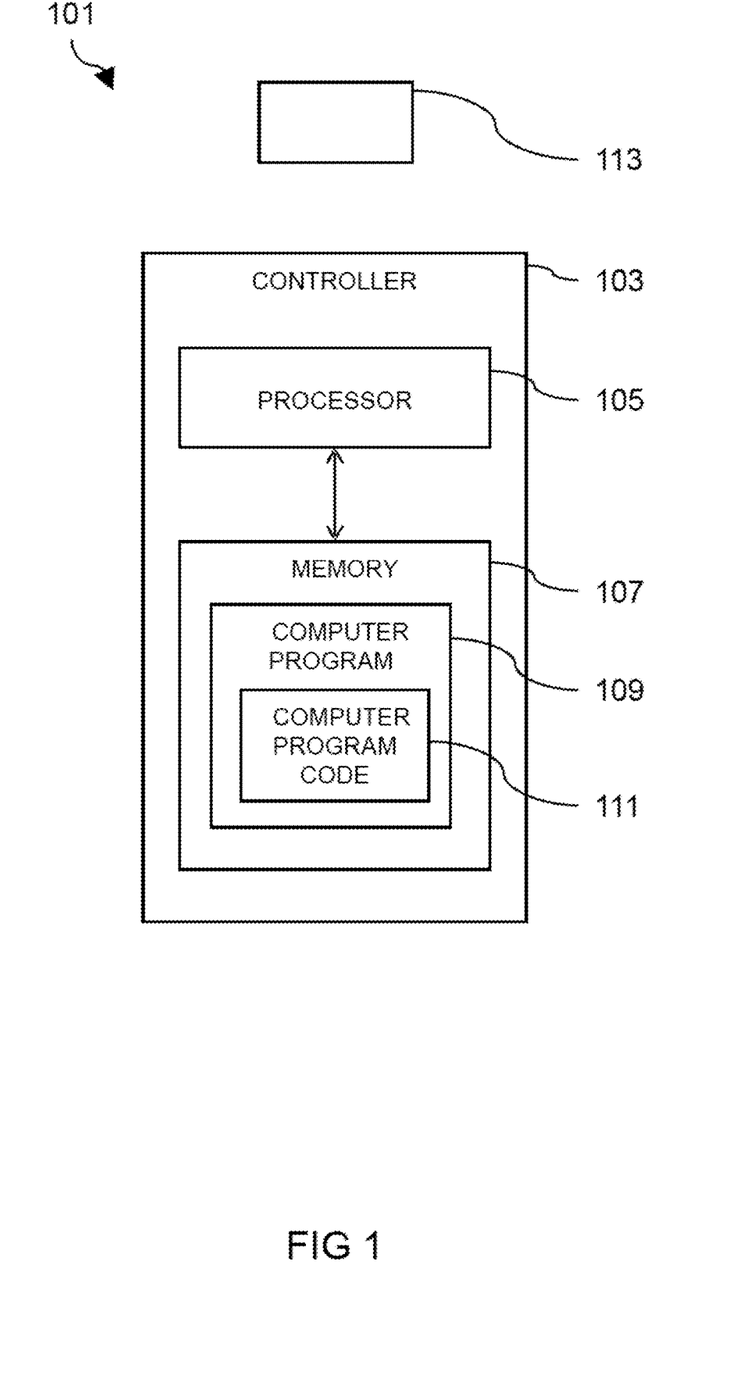
FIG. 1 shows an example apparatus.

FIG. 1 schematically illustrates an apparatus 101 according to examples of the disclosure. The apparatus 101 illustrated in FIG. 1 may be a chip or a chip-set.

In the example of FIG. 1 the apparatus 101 comprises a controller 103. Implementation of the controller 103 may be as controller circuitry. The controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory, etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 stores a computer program 109 comprising computer program instructions (computer program code 111) that controls the operation of the apparatus 101 when loaded into the processor 105. The computer program instructions, of the computer program 109, provide the logic and routines that enables the apparatus 101 to perform the method 201 illustrated in FIG. 2, and optionally the method 301 illustrated in FIG. 3. The processor 105 by reading the memory 107 is able to load and execute the computer program 109.

The apparatus 101 therefore comprises: at least one processor 105; and at least one memory 107 including computer program code 111, the at least one memory 107 and the computer program code configured to, with the at least one processor 105, cause the apparatus 101 at least to perform: determining 203 at least two locations at which a user touches a device 401; selecting 205 a first location 407 and a second location 409 from the at least two locations to define a transmission path 411 for an acoustic signal through the user; applying 207 an acoustic signal to the user through the first location 407; detecting 209 an acoustic signal transmitted through the user at the second location 409; and analysing 211 the detected acoustic signal to determine if it is indicative of transmission of the applied acoustic signal through an authorised user based on a known bioacoustic signature of the authorised user.

As illustrated in FIG. 1, the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IPv6 over low power personal area networks) ZigBee, ANT+, near field communication (NFC), Radio frequency identification, wireless local area network (wireless LAN) or any other suitable protocol.

In some examples there is provided computer program instructions for causing an apparatus 101 to perform at least the following: causing determination 203 of at least two locations at which a user touches a device 401; selecting 205 a first location 407 and a second location 409 from the at least two locations to define a transmission path 411 for an acoustic signal through the user; causing application 207 of an acoustic signal to the user through the first location 407; causing detection 209 of an acoustic signal transmitted through the user at the second location 409; and analysing 211 the detected acoustic signal to determine if it is indicative of transmission of the applied acoustic signal through an authorised user based on a known bioacoustic signature of the authorised user.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
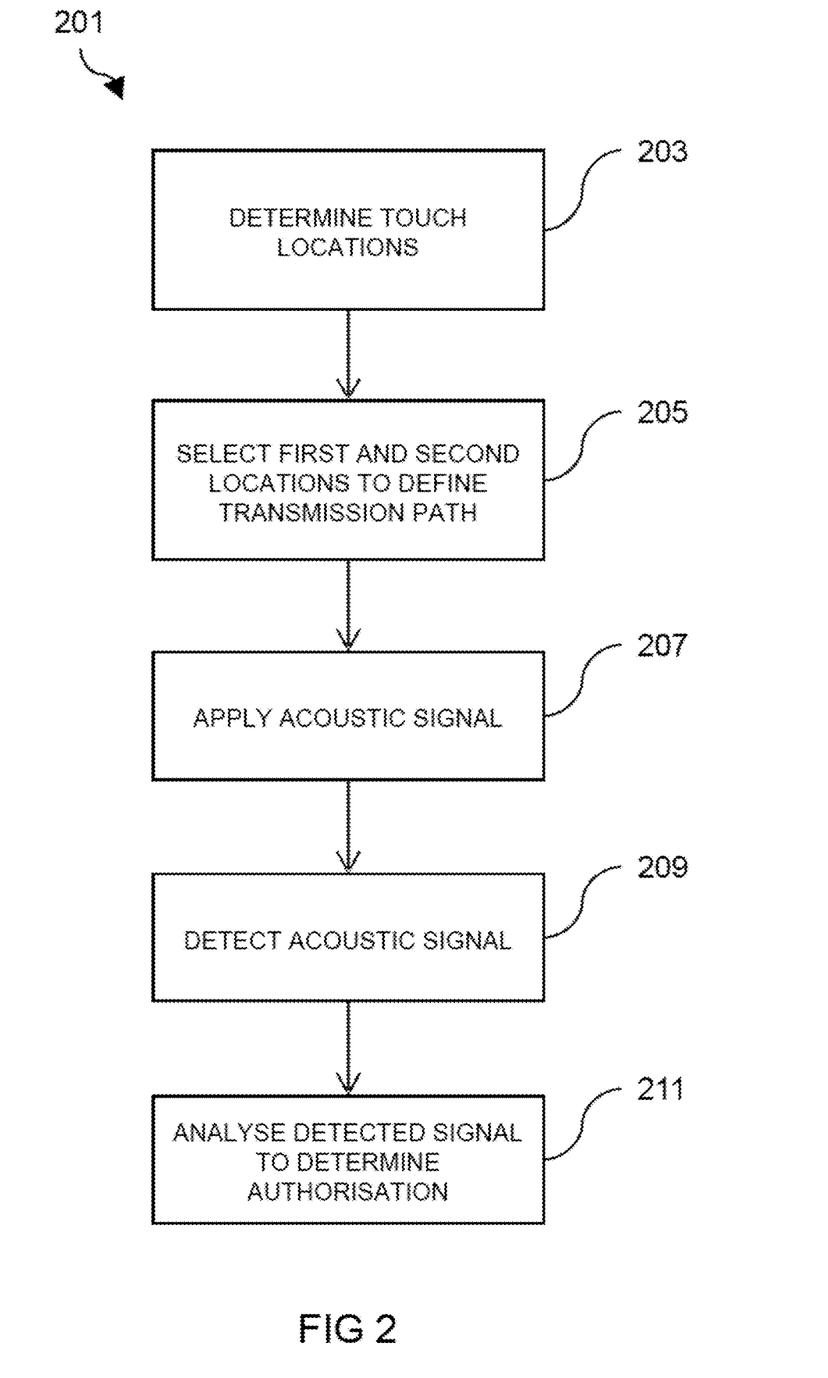
FIG. 2 shows an example method.
Figure 3:
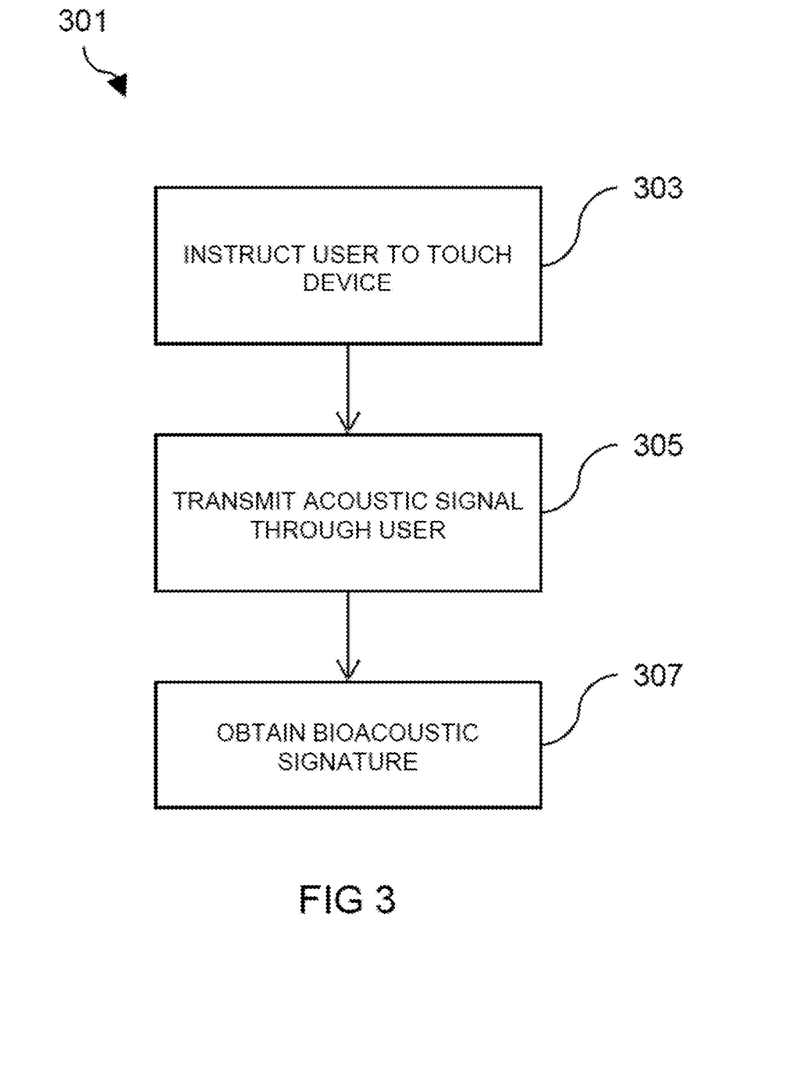
FIG. 3 shows another example method.

The blocks illustrated in FIG. 2 and, in some examples, those illustrated in FIG. 3 may represent steps in a method and/or sections of code in the computer program 109. The illustration of a particular order to the blocks does not necessarily imply that there is a required or preferred order for the blocks and the order and arrangement of the block may be varied. Furthermore, it may be possible for some blocks to be omitted.

FIG. 2 shows an example method 201 that can be implemented by the apparatus 101 as shown in FIG. 1. The example method 201 is an authentication method 201.

The method 201 comprises, at block 203, determining at least two locations at which a user touches a device 401.

Determining locations at which a user touches the device 401 ("touch locations") can be enabled by touch screen technologies which detect touch locations such as capacitive sensing, resistive sensing, surface acoustic wave sensing, optical sensing, and other suitable means.

Touch locations on parts of the device 401 other than a touch screen can also be determined.

For panels 403, 405 of the device 401 which can be vibrated in a manner which acoustically actuates different locations on the panel 403, 405 on demand, for example by creating standing waves from vibrations of the panel 403, 405 with differently located displacement antinodes, different locations can be acoustically actuated and the response can be measured. A deadened response is indicative of touch contact at an acoustically actuated location.

Hand posture modelling based on one or more touch properties such as location, pressure, angle, and shape of one touch on a touch screen can be used to predict other touch locations which may not be on the touch screen.

In some examples, guidance can be provided to the user which indicates where the user should touch the device 401 based on which possible transmission paths 411 have the highest associated authentication confidence scores.

It is to be appreciated that possible transmission paths 411 may not necessarily be limited to those which have been established to exist but can also include putative transmission paths 411, for example based on anatomic possibilities of the user's hand 413 given the form and dimensions of the device 401.

The authentication confidence score associated with a transmission path 411 indicates the probability of a correct authentication when using this path 411 as a biometric. The higher the authentication confidence score, the lower the probability of a false authentication. The authentication confidence score may reflect properties of uniqueness and repeatability. Uniqueness is a measure of how well acoustic transmission properties of the path 411 can be distinguished from known others. Repeatability is a measure of how little the acoustic transmission properties of the path 411 are affected by other factors.

The guidance may also indicate with which part of the user's hand 413 the device 401 should be touched.

The guidance may be provided by a UI output of the device 401 such as a visual display or acoustic instructions.

By way of an illustrative example, the user may be directed by the guidance to place one of their fingers on the existing microphone housing on the device 401 as this touch position may enable a more sensitive measurement of an acoustic signal transmitted from the user to the device 401. By way of another illustrative example, the user may be directed by the guidance to place one of their fingers on a haptic button on the device 401 as this touch position may enable a strongly localised acoustic signal to be transmitted from the device 401 to the user.

Guidance may also be provided to the user in some examples where the device 401 is one which is transformable between different geometrical configurations, such as where the device 401 is a sliding or flip phone. The user may be guided to transform the device 401 into a certain geometrical configuration before the authentication method 201 is implemented. Certain configurations may provide for possible transmission paths 411 which have higher associated authentication confidence scores than the transmission paths 411 that are possible in other configurations.

At block 205 the method 201 comprises selecting a first location 407 and a second location 409 from the at least two locations to define a transmission path 411 for an acoustic signal through the user.

In some examples, for the at least two touch locations, the parts of the user's hand 413 which provide the touch contact are determined. The parts of the hand may be identified in terms of the most proximate bone.

To determine the parts of the user's hand 413 which provide the touch contact, the device 401 may employ an under-screen fingerprint reader to identify which digit provides the touch contact at the different touch locations.

The parts of the user's hand 413 which provide the touch contact can also be determined based on one or more properties of the touch contact ("touch properties"). One or more touch properties can be detected at one or more of the at least two locations at which a user touches a device 401. Touch properties can comprise, for example, the pressure, angle, shape of the touch contact. From the pressure, angle, and shape, as well as the location, probabilities of different hand postures can be determined. This can be achieved using a machine learning algorithm trained, for example, via supervised learning using training data in which input touch pressure, angle, shape, and location data are labelled according to known corresponding hand postures. Based on the most probable hand posture, the parts of the user's hand 413 which provide the touch contact can be predicted.

Hand posture can also be determined using a capacitive sensor configured to provide information indicative of a contour of an object proximate the device 401, based on the electrical conductivity of that object (a hand 413) in contrast to the electrical conductivity (or relative lack thereof) of air. This contour can be matched with known hand postures. Again, based on the most probable hand posture, the parts of the user's hand 413 which provide the touch contact can be predicted.

In some examples, having determined a hand posture of the user when touching the device 401 at the at least two locations, the selection of the first location 407 and the second location 409 can be made conditional on the determined hand posture corresponding to a predefined hand posture for the user. The user may set the predefined hand posture or may be informed of what the predefined hand posture is set as. The predefined hand posture is therefore a knowledge factor. Since the bioacoustic signature is an inherence factor, multi-factor authentication is enabled without requiring multiple actions by the user.

In some examples the available transmission paths 411, for an acoustic signal, through the user between the parts of the user's hand 413 which provide the touch contact can be identified. The identities of the available transmission paths 411 are determined from the parts of the user's hand 413 which provide the touch contact.

Selecting the first location 407 and the second location 409 comprises, in this example, selecting one of the available transmission paths 411.

Where only two touch locations are determined, there are two available transmission paths 411—one from a first part of the user's hand 413 to a second part of the user's hand 413 and one from the second part of the user's hand 413 to the first part of the user's hand 413. By way of an illustrative example, the first part can be a knuckle 417 and the second part may be a corresponding fingertip 415. The knuckle 417 is effectively a junction for two different bone conduction paths—one into the metacarpus and one into the phalanges. In contrast the fingertip 415 provides for only one bone conduction path—into the phalanges. Thus, an acoustic signal applied to the knuckle 417 is more likely to be dissipated into bone conduction paths which don't reconnect with the device 401. As a result, the detected acoustic signal may be weaker if the acoustic signal is applied to the knuckle 417 rather than to the fingertip 415. Thus, a selection of the touch location corresponding to the fingertip 415 as the first location 407 may yield a detected acoustic signal with a better signal-to-noise ratio, thus supporting a higher confidence in authentication based upon the detected signal.

Selecting of one of the available transmission paths 411 can be based on authentication confidence scores associated with the available transmission paths 411.

The authentication confidence scores may comprise a fixed component and optionally a variable component.

The fixed component may be specific to the identity of transmission path 411.

The variable component may be responsive to one or more touch properties such as pressure, angle, and shape of touch—all of which can affect transmission of an acoustic signal across the interface between the device 401 and the user.

Where there are more than two touch locations to select between, the variable component may also depend on how feasible it is to reduce or prevent vibrations from propagating into the user from the device 401 at the touch locations which would not form part of the selected transmission path 411. For example, where the acoustic signal may be applied to a user by forming an acoustic standing wave on a panel 403, 405 of the device 401 with a displacement antinode at the first location 407 (as described in more detail in relation to FIGS. 4A to 4D below), to prevent vibrations propagating into a user at other touch locations on the same panel 403, 405, the standing wave should have displacement nodes at these other touch locations. Reducing or preventing vibrations from propagating into the user from the device 401 at the touch locations which do not form part of the selected transmission path 411 means that multiple acoustic signals are not transmitted to the second location 409 along different transmission paths 411 through the user. This may reduce the challenge in determining if the detected signal indicates transmission via an authenticated user.

In some examples the selecting the first location 407 and the second location 409 can be based on just these variable components without requiring specific identification of the available transmission paths 411. As a result, in some examples parts of the user's hand 413 providing touch contact may not be determined.

Therefore, in some examples selecting the first location 407 and the second location 409 comprises detecting one or more touch properties at one or more of the at least two locations at which a user touches a device 401 and then selecting, as the first and second locations 407, 409, those locations for which touch properties provide least transformation (such as attenuation or frequency shifting) of the acoustic signal across the interface between the device 401 and the user.

Also therefore, in some examples selecting the first location 407 and the second location 409 comprises selecting, as the first location 407, a touch location at which an acoustic signal can be provided while no or relatively small vibrations are formed at other ones of the touch locations.

In some examples selecting the first location 407 is conditional on the first location 407 being one for which localised vibrations can be controlled to produce a target acoustic signal. If a target acoustic signal cannot be produced at a touch location, it may not be selected as the first location 407. For example, the options for the first location 407 may be constrained to those locations on a panel 403, 405 of a device 401 where a displacement antinode of a standing wave can be formed from vibrations of the panel 403, 405.

In some examples selection of the second location 409 is conditional on the second location 409 being one for which localised vibrations can be measured.

The first and second locations 407, 409 are different locations. The selection of the first and second locations 407, 409 is a selection of two different locations.

At block 207 the method 201 comprises applying an acoustic signal to the user through the first location 407.

In some examples the applied acoustic signal is adapted for the defined transmission path 411, which may have been identified from the parts of the user's hand 413 which provide the touch contact.

The transmission path-adapted acoustic signal can be obtained by calculation or by measurement, such as described in relation to the calibration method 301 of FIG. 3 below, of the acoustic signal which will best emphasise the unique and distinguishing features of the acoustic transmission properties of the path 411.

In some examples the applied acoustic signal is adapted based on one or more touch properties at the first and/or second locations 407, 409.

Adapting the acoustic signal to be applied based on one or more touch properties can comprise applying a transformation which accounts, at least in part, for the effect of variations in touch location, pressure, angle, shape. Alternatively, an acoustic signal can be looked-up from a record of target acoustic signals indexed by identified transmission paths 411, touch locations, pressures, angles, and shapes.

In some examples the acoustic signal to be applied can be determined by selecting a base signal adapted for a stored transmission path 411 which is closest to the defined transmission path 411 and subsequently applying to the base signal a transformation which accounts, at least in part, for difference between closest stored transmission path 411 and defined transmission path 411.

Rather than adapting the acoustic signal to be applied based on context such as the defined transmission path 411 or touch properties, a novel acoustic signal can be applied. This can provide greater security since there is no recorded response which could be played back to spoof the authentication method 201 however the authentication confidence score may be reduced since the novel acoustic signal would not be adapted for the context.

It is to be appreciated that the applied acoustic signal could be neither adapted for the context nor novel.

At block 209 the method 201 comprises detecting an acoustic signal transmitted through the user and transmitted back to the device 401 at the second location 409. The acoustic signal transformed by transmission along the defined transmission path 411 through the user is detected.

At block 211 the method 201 comprises analysing the detected acoustic signal to determine if it is indicative of transmission of the applied acoustic signal through an authorised user. Determining if the detected acoustic signal is indicative of transmission of the applied acoustic signal through an authorised user can be based on a known bioacoustic signature of the authorised user.

Bioacoustic signatures can be recorded explicitly, such as in the form of transfer functions, or implicitly, such as in the form of input-output, stimulus-response pairs.

Access to at least one application can be controlled in dependence on whether or not the detected acoustic signal is indicative of transmission of the applied acoustic signal through an authorised user. The at least one application may be a function or set of functions that the device 401 is configured to perform or enable. For example, the application may be online credit and debit card transactions.

In some examples, the detected acoustic signal is processed to extract the transfer function of the transmission path 411. The extracted transfer function can be compared to known bioacoustic signatures of the authorised user using correlations, pattern recognition or any other suitable process.

Alternatively, the detected acoustic signal can be compared to recorded responses to stimuli which match the applied acoustic signal, particularly the recorded responses associated with transmission via the defined transmission path 411.

If the comparison shows a good match or correlation then access to at least one application can be permitted.

If the comparison does not show a good match or correlation then access to at least one application can be denied. In some examples an alert can be provided to the user that access is denied. Guidance may be provided to the user to indicate that the user should change where they touch the device 401.

The authentication method 201 described above in relation to FIG. 2 can be performed continuously or at regular intervals so that the user is continuously or regularly authenticated. This enables access to at least one application to be initiated upon picking the device 401 up and access to be terminated upon putting the device 401 down. Alternatively, the authentication method 201 can be performed on an ad-hoc basis, for example in response to a user's request for access to at least one application.

FIG. 3 shows an example method 301 that can be implemented by the apparatus 101 as shown in FIG. 1. The example method 301 is a calibration method 301.

The calibration method 301 may have multiple purposes.

A purpose of the calibration method 301 is to obtain at least one bioacoustic signature of the user who is to be designated as an authorised user. Multiple bioacoustics signatures of the user can be obtained in respect of different transmission paths 411 through the user, thus enabling the authentication method 201 to be performed with less limitations on how the user may touch the device 401.

At block 303 the calibration method 301 comprises instructing the user to touch the device 401 at at least two locations simultaneously.

In some examples the at least two locations may be specified to the user. In other examples the at least two locations are a free choice for the user. In some examples, and where the device 401 is hand-portable, the user may be instructed to grip the device 401 in a manner that feels natural for ordinary use.

At block 305 the calibration method 301 comprises transmitting at least one acoustic signal through the user between one or more pairs of the at least two locations.

At block 307 the calibration method 301 comprises obtaining at least one bioacoustic signature of the user from the acoustic signal transmitted back to the device 401 from the user.

The calibration method 301 may further comprise instructing the user to vary the locations at which they touch the device 401. In some examples, and where the device 401 is hand-portable, the user may be instructed to vary their grip of the device 401 to another grip that feels natural for ordinary use.

Following a variation of touch locations, blocks 305 and 307 may be repeated in respect of the new touch locations.

Another, and optional, purpose of the calibration can be to identify transmission paths 411 provided by the user touching the device 401 and determine and record authentication confidence scores associated with the identified transmission paths 411. These may be used in the selecting of the first and second locations 407, 409 at block 205 of the authentication method 201.

Identification of the transmission paths 411 can be achieved by determining which parts of the user's hand 413 provide the touch contact in the manner described in the foregoing.

Yet another, and again optional, purpose of the calibration can be to determine how to adapt acoustic signals, which are to be applied to the user, for different ones of the identified transmission paths 411.

To this end, different acoustic signals can be transmitted along each of the transmission paths 411, for example by transmitting a chirp into the user. The acoustic signals which best emphasise the unique and distinguishing features of the acoustic transmission properties of each path 411 can be determined.

FIGS. 4A to 4D show an example implementation of the disclosure. The implementation comprises a device 401 such as a mobile phone or any other suitable type of device such as other computing or communication devices and other hand-portable computing or communication devices.

The device 401 can comprise an apparatus 101 as shown in FIG. 1.

The device 401 comprises a panel 403, 405 forming at least part of a display or casing of the device 401 and at least one actuator (not shown) configured to apply force to the panel 403, 405 to cause vibration of the panel 403, 405. In some examples a plurality of actuators are configured to apply force to the same panel 403, 405. In some examples an actuator configured to apply force to the panel 403, 405 comprises multiple movable elements, each able to apply a different force to the panel 403, 405.

Figure 4A:
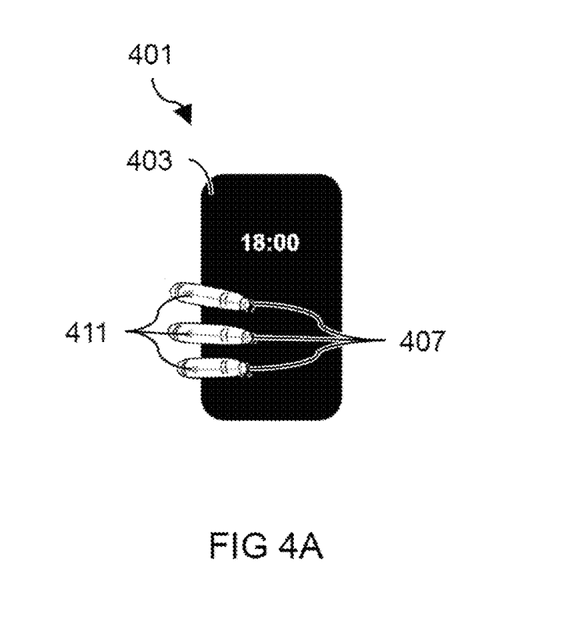
FIGS. 4A to 4D show an example implementation of the disclosure.
Figure 4B:
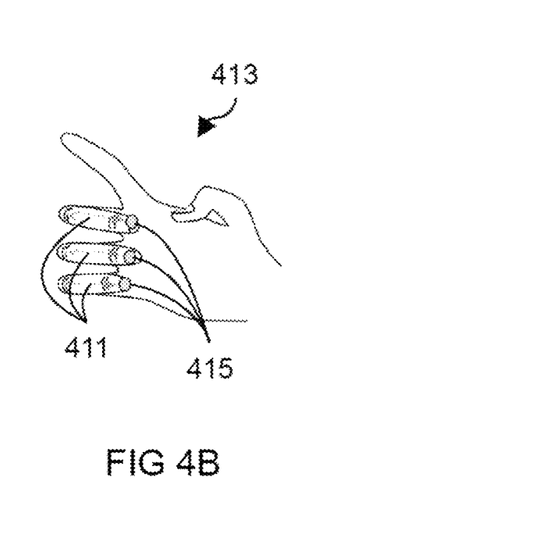
Figure 4C:
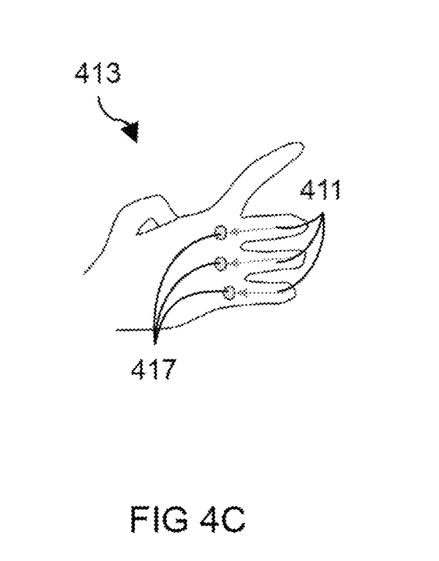
Figure 4D:
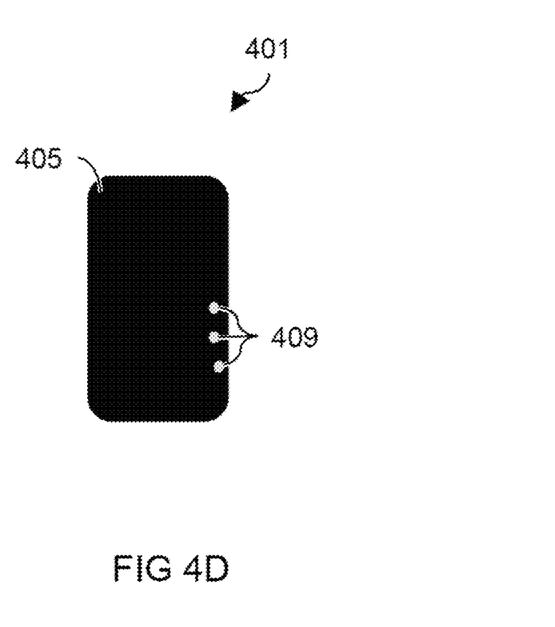

Two such panels 403, 405 may be provided on different sides of the device 401, for example on the front as shown in FIG. 4A and the back as shown in FIG. 4D. The panel 403 on the front of the device 401 may form at least part of the display and the panel 403 on the back of the device 401 may form part of the casing. The provision of front and back panels 403, 405 which can enable application and detection of acoustic signals as per blocks 207 and 209 of the authentication method 201 can enable the authentication method 201 to be performed while the user grips the device 401 in a natural manner.

It is to be appreciated that the device 401 can comprise more than two such panels 403, 405.

Applying an acoustic signal to the user through the first location 407, as per block 207 of the authentication method 201 can comprise causing the plurality of actuators, or the multiple movable elements of an actuator, to vibrate the panel 403, 405 so that a superposition of vibrations at the first location 407 produces the acoustic signal. Adjustment of the frequencies and phases of the actuators, or movable elements of an actuator, creates different excitation patterns on the panel 403, 405.

Detecting an acoustic signal transmitted through the user comprises measuring the force applied to the plurality of actuators, or multiple movable elements of an actuator, by vibrations of the panel 403, 405 induced by the transmission of the acoustic signal from the user to the panel 403, 405 at the second location 409.

There will be a time delay between applying the acoustic signal and detecting the acoustic signal. Therefore, the first and second locations 407, 409 can be on the same panel 403, 405 of the device 401 and the acoustic signal transmitted from the user to the panel 403, 405 at the second location 409 can be detected by time gating the electrical signal(s) associated with the actuators. Alternatively, the device 401 may comprise multiple such panels 403, 405 and the first and second locations 407, 409 may be on different panels 403, 405 so that time gating is not required.

In the example implementation of FIG. 4A, a display panel 403 is vibrated in a manner that produces target acoustic signals at the locations where a user's fingertips 415 touch the display panel 403. The acoustic signals are transmitted into the user via their fingertips 415. The acoustic signals are transmitted along paths 411 in each of the fingers that made contact with the display panel 403, from the fingertips 415 to the knuckles 417, as shown in FIG. 4B, showing a palmar side of the user's hand 413, and FIG. 4C, showing a dorsal side of the user's hand 413. The knuckles 417, on the palmar side, are in contact with a rear casing panel 405 of the device 401 as shown in FIG. 4D. The acoustic signals which have been transmitted along the user's fingers are transmitted, at least in part, from the knuckles 417 to the rear casing panel 405, enabling detection of these signals transmitted through the user. Analysis of these detected acoustic signals reveals whether or not the user is authorised to access at least one application using the device 401.

As can be seen from this example implementation, examples of the disclosure are not limited to transmitting just one acoustic signal through the user at one time via one transmission path 411, but can transmit acoustic signals via different transmission paths 411 through the user simultaneously. In such cases the selection of first and second locations 407, 409 at block 205 of the authentication method 201 is performed in respect of multiple pairs of first and second locations 407, 409 to define multiple transmission paths 411.

While examples described herein mostly refer to the user's fingers, fingertips and fingerprints, it should be understood that other parts of the user's hand 413, for example the user's thumb, may be used to provide a touch contact at a touch location on part of the device 401, form part of a transmission path 411, and/or be scanned by a fingerprint reader of the device 401.

Where a structural feature has been described, it may be replaced by means for performing one or more of the functions of the structural feature whether that function or those functions are explicitly or implicitly described.

Consequently, in some examples, the apparatus 101 comprises means for: determining 203 at least two locations at which a user touches a device 401; selecting 205 a first location 407 and a second location 409 from the at least two locations to define a transmission path 411 for an acoustic signal through the user; applying 207 an acoustic signal to the user through the first location 407; detecting 209 an acoustic signal transmitted through the user at the second location 409; and analysing 211 the detected acoustic signal to determine if it is indicative of transmission of the applied acoustic signal through an authorised user based on a known bioacoustic signature of the authorised user.

In some but not necessarily all examples, the apparatus 101 is configured to communicate data from the apparatus 101 with or without local storage of the data in a memory 107 at the apparatus 101 and with or without local processing of the data by circuitry or processors 105 at the apparatus 101.

The data may, for example, be: the detected acoustic signal of block 209 of the authentication method 201; the bioacoustics signatures obtained via the calibration method 301; the identities of and associated authentication confidence scores for transmission paths 411 obtained also via the calibration method 301; and the transmission path-adapted acoustic signals obtained also via the calibration method 301.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long-range cellular radio links.

The apparatus may comprise a communications interface such as, for example, a radio transceiver for communication of data.

The apparatus 101 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 101 where it may produce an output sensible to the subject such as an audio output, visual output or haptic output.

The recording of data may comprise only temporary recording, or it may comprise permanent recording or it may comprise both temporary recording and permanent recording. Temporary recording implies the recording of data temporarily. Permanent recording implies that the data is in the form of an addressable data structure that is retrievable from an addressable memory space and can therefore be stored and retrieved until deleted or over-written, although long-term storage may or may not occur.

The apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one" or by using "consisting".

In this description, reference has been made to various examples. The description of features or functions in relation to an example indicates that those features or functions are present in that example. The use of the term "example" or "for example" or "can" or "may" in the text denotes, whether explicitly stated or not, that such features or functions are present in at least the described example, whether described as an example or not, and that they can be, but are not necessarily, present in some of or all other examples. Thus "example", "for example", "can" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term "a" or "the" is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavouring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one non-transitory memory including computer program code;
   the at least one memory and the computer program code configured to, with the at least one processor, cause the apparatus to:
   determine at least two locations at which a user touches a device;
   select a first location and a second location from the at least two locations to define a transmission path for an acoustic signal through the user;
   apply an acoustic signal to the user through the first location;
   detect an acoustic signal transmitted through the user at the second location;
   analyse the detected acoustic signal to determine if it is indicative of transmission of the applied acoustic signal through an authorised user based on a known bioacoustic signature of the authorised user;

wherein the at least one memory and the computer program code are configured to, with the at least one processor, cause the apparatus to: for the at least two touch locations, determine which parts of the user's hand provide the touch contact; and wherein selecting the first location and a second location comprises: identifying available transmission paths, for an acoustic signal, through the user between the parts of the user's hand which provide the touch contact; and selecting one of the available transmission paths.

2. The apparatus of claim 1 wherein selecting of one of the available transmission paths is based on authentication confidence scores associated with the available transmission paths.

3. The apparatus of claim 1 wherein selecting the first location is conditional on the first location being one for which localised vibrations can be controlled to produce a target acoustic signal.

4. The apparatus of claim 1 wherein selection of the second location is conditional on the second location being one for which localised vibrations can be measured.

5. The apparatus of claim 1 wherein the applied acoustic signal is adapted for the defined transmission path.

6. The apparatus of claim 1 wherein the applied acoustic signal is adapted based on one or more touch properties at the first and/or second locations.

7. The apparatus of claim 1 wherein analysing the detected acoustic signal comprises: processing the detected acoustic signal to extract the transfer function of the transmission path; and determining whether the extracted transfer function corresponds to the known bioacoustic signature of the authorised user.

8. The apparatus of claim 1 wherein the at least one memory and the computer program code are configured to, with the at least one processor, cause the apparatus to:
control access to at least one application in dependence on whether or not the detected acoustic signal is indicative of transmission of the applied acoustic signal through an authorised user.

9. The apparatus of claim 1 wherein the at least one memory and the computer program code are configured to, with the at least one processor, cause the apparatus to:
enable guidance to be provided to the user which indicates where the user should touch the device based on which possible transmission paths have the highest associated authentication confidence scores.

10. The apparatus of claim 1 wherein the at least one memory and the computer program code are configured to, with the at least one processor, cause the apparatus to:
determine a hand posture of the user when touching the device at the at least two locations, and wherein selection of the first location and the second location is conditional on a hand posture corresponding to a predefined hand posture for the user.

11. The apparatus of claim 1 wherein applying an acoustic signal to the user through the first location comprises causing multiple movable elements of an actuator, or a plurality of actuators, to vibrate a panel forming at least part of a display or casing of the device so that a superposition of vibrations at the first location produces the acoustic signal.

12. A method comprising:
determining at least two locations at which a user touches a device;
selecting a first location and a second location from the at least two locations to define a transmission path for an acoustic signal through the user;
applying an acoustic signal to the user through the first location;
detecting an acoustic signal transmitted through the user at the second location;
analysing the detected acoustic signal to determine if it is indicative of transmission of the applied acoustic signal through an authorised user based on a known bioacoustic signature of the authorised user; and
for the at least two touch locations, determining which parts of the user's hand provide the touch contact;
wherein selecting the first location and a second location comprises: identifying available transmission paths, for an acoustic signal, through the user between the parts of the user's hand which provide the touch contact; and selecting one of the available transmission paths.

13. The method of claim 12 further comprising:
enabling guidance to be provided to the user which indicates where the user should touch the device based on which possible transmission paths have the highest associated authentication confidence scores.

14. The method of claim 12 further comprising:
determining a hand posture of the user when touching the device at the at least two locations, and wherein selection of the first location and the second location is conditional on a hand posture corresponding to a predefined hand posture for the user.

15. A non-transitory computer readable medium comprising program instructions stored thereon for performing at least the following:
causing determination of at least two locations at which a user touches a device;
selecting a first location and a second location from the at least two locations to define a transmission path for an acoustic signal through the user;
causing application of an acoustic signal to the user through the first location;
causing detection of an acoustic signal transmitted through the user at the second location;
analysing the detected acoustic signal to determine if it is indicative of transmission of the applied acoustic signal through an authorised user based on a known bioacoustic signature of the authorised user; and
for the at least two touch locations, determining which parts of the user's hand provide the touch contact;
wherein selecting the first location and a second location comprises: identifying available transmission paths, for an acoustic signal, through the user between the parts of the user's hand which provide the touch contact; and selecting one of the available transmission paths.

16. The non-transitory computer readable medium of claim 15 further comprising program instructions stored thereon for performing at least the following:
enabling guidance to be provided to the user which indicates where the user should touch the device based on which possible transmission paths have the highest associated authentication confidence scores.

* * * * *